March 18, 1952 H. E. OVERACKER 2,589,852

MECHANICAL TRACKING DEVICE

Filed Aug. 8, 1945

INVENTOR

HORACE E. OVERACKER

BY

William D. Hall

ATTORNEY

Patented Mar. 18, 1952 2,589,852

UNITED STATES PATENT OFFICE 2,589,852

MECHANICAL TRACKING DEVICE

Horace E. Overacker, Cambridge, Mass., assignor to the United States of America as represented by the Secretary of War Application August 8, 1945, Serial No. 609,649

1 Claim. (Cl. 74—63)

This invention relates in general to mechanisms for adjusting the relation between two rotary motions. More specifically it relates to mechanism for small predetermined variations in the relative motion between two shafts designed to rotate at substantially the same speed There are widespread uses for mechanisms to control the relative motion between two rotating shafts in many varied arts. For example, automatic machine tools present problems that car be solved by the use of such mechanisms. One very important use of such a mechanism is as a tracking device between ganged tuning mechanisms of radio circuits. It is frequently desired to tune two or more radio circuits over a range of frequencies so that their resonant frequencies will at any instant be the same and in other cases, so that the resonant frequencies will have a constant fixed difference. Due to variations in the rates of change of electrical characteristics of the tuning element that cannot be eliminated even by most careful manufacture, equal angular motion of shafts controlling tuning elements do not produce equal changes in capacity or inductance and therefore fail to produce desired equal changes in frequency. Specific instances of this problem are found in superheterodyne radio receivers where it is desired to tune by one control radio frequency amplifier circuits and local oscillator circuits to have a fixed and constant difference in frequency and in tuned-radio-frequency radio receivers where it is desired to tune several radio frequency circuits to the same frequency. Prior art solutions of this problem such as the practice of bending end plates of variable condenser and the use of fixed padding condenser have limitations which become very serious at high frequencies. The basis of such adjustments has been to attempt to change the tuning element itself rather than to effect, as in the present invention, an adjustment in the relative amount of angular movement of the ganged tuning controls operated by single control.

An object of the present invention is to provide simple, easily adjustable, and positively acting means by which variations between the speed of rotation of two rotating shafts may be accomplished.

In order to attain this object the two shafts are arranged concentrically with one free to rotate with respect to the other. Between the driver shaft and the driven shaft is a mechanical linkage effecting, at all points around the circle of rotation, the relative angular position of the two shafts. The mechanical linkage is controlled by a cam in the shape of a deformed circle in which the deformations from a true circle represent the variations it is desired to effect.

Figure 1:
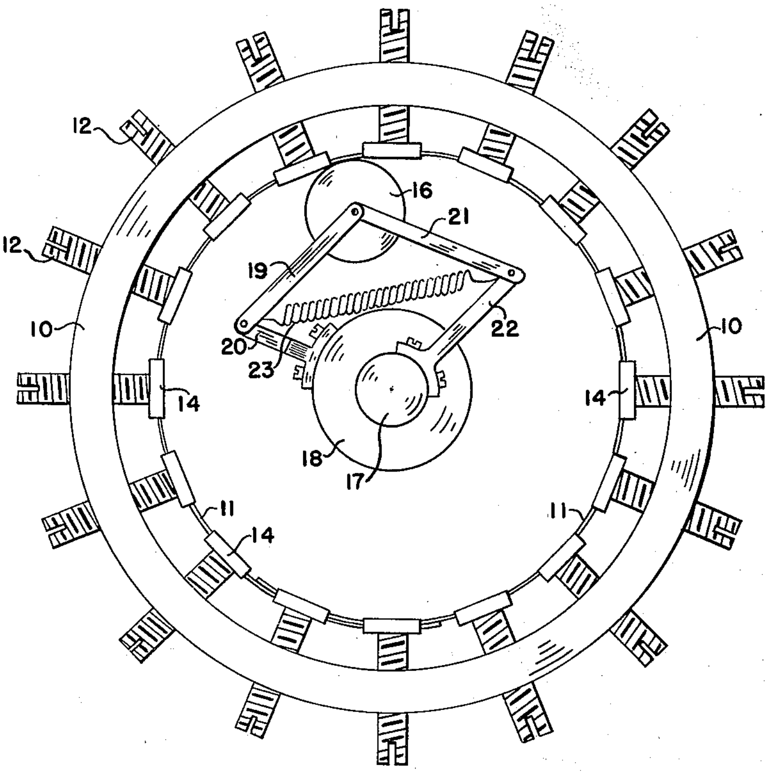

Other objects, features and advantages of this invention will suggest themselves to those skilled in the art and will become apparent from the following description of the invention taken in connection with the accompanying drawings in which:

Fig. 1 is an end view of a device embodying the present invention.

Figures 1A, 2:
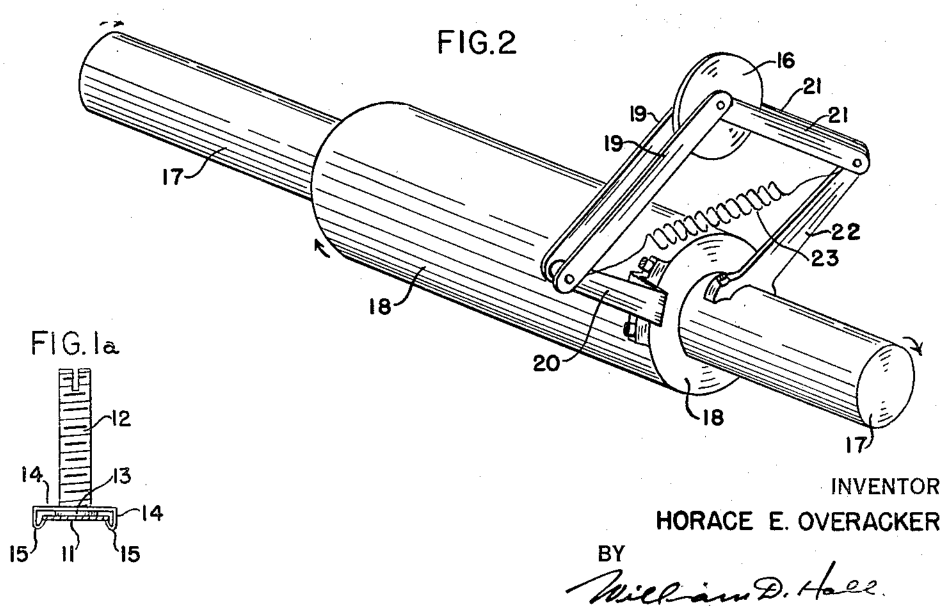

Fig. 1*a* is a detailed drawing of one of the screws for adjusting the cam.

Fig. 2 is an isometric view of the shafts and mechanical linkage.

Referring now to Figs. 1 and 1*a*, the circular framework 10 upon which the cam 11 is mounted is provided with threaded and radially disposed holes equally spaced at small angular intervals around its circumference into which adjustment screws 12 are inserted. The inner ends of screws 12 have flanges 13 engaging specially designed lugs 14. These lugs have inwardly extending flangelike portions 15 which form a groove into which cam 11 fits and by which it is held in a fixed position determined by the positions of screws 12. Cam 11 is made of any flexible material that presents a good bearing surface, such as highly tempered spring steel.

Cam 11 thus forms a track over which roller 16 travels. This roller is rotatably mounted on the mechanical linkage that controls the relative motion between shafts 17 and 18. The mechanical linkage comprises two sets of two arms all of which are freely pivoted at their ends except those attached to shafts 17 and 18. Arm 19 is connected at one end by a rotatable joint to roller 16, at its other end it is pivotally connected to arm 20 which in turn is rigidly attached to driven shaft 18. Similarly arm 21 is connected to roller 16 and arm 22 which is rigidly attached to driver shaft 17. The pivoted connections between arms 19 and 20 and arms 21 and 22 are held in position by tension spring 23.

If screws 12 are adjusted so that all their inner ends are equidistant from the center of the circle formed by frame 10, the track for roller 16 formed by cam 11 will be circular. The result will be that all the elements of the mechanical linkage will remain in unchanged position with the respect to each other and there will be no variation in the angular displacement of shafts 17 and 18 as they are rotated.

If adjustment of any of screws 12 is made so that their inner ends are not equidistant from the center of the framework, it is obvious that cam 11 will be forced into a configuration deviating from a true circle and, therefore, that the path of travel of roller 16 will not be a true circle. When roller 16 is at a portion of cam 11 which has been adjusted to be nearer to the center than it would be if cam 11 formed a true circle, the relative position of the elements of the mechanical linkage are changed; arms 19 and 21 are moved so that the places where they are respectively attached to arms 20 and 22 are spread against the tension of spring 23. This results in the places where arm 20 is attached to shaft 18 and arm 22 is attached to shaft 17 to become more angularly separated. Consequently shafts 17 and 18 must for the duration of such conditions travel at different speeds. If the direction of rotation is such that the connection of arm 22 to driver shaft 17 leads the connection of arm 20 to driven shaft 18, the speed of shaft 18 will be reduced with respect to the speed of shaft 17. If the relative positions of the connections, or the direction of rotation, is reversed, shaft 18 will speed up with respect to shaft 17.

In like manner when roller 16 is at a position on the track formed by cam 11 that is further away from the center than would be the case if cam 11 were a true circle, the elements of the mechanical linkage are relatively moved to decrease the angular displacement between shafts 17 and 18. This will cause a relative speeding up of shaft 18 if the direction of rotation is such that the connection of arm 22 to shaft 17 leads the connection of arm 20 to shaft 18.

Although in the present description, inner shaft 17 is the driver shaft and outer shaft 18 the driven shaft, it will be obvious to those skilled in the art that the device will operate as satisfactorily, if the outer shaft is made the driver shaft and the inner one is the driven shaft.

It is obvious also that more than two mechanical elements can be tracked by this device. All that is needed is an additional cam and mechanical linkage for each added mechanical linkage for each added mechanical element.

While there has been here described what is at present considered to be the preferred embodiment of the invention, it will be obvious to those skilled in the art that various changes and modifications may be made therein without departing from the scope of the invention.

What is claimed is:

A device for producing variations in the relative angular motion of two concentric shafts, comprising a circular framework, a flat normally circular cam substantially uniformly flexible throughout its entire perimeter, means for deforming and supporting said cam, said means comprising a series of adjustment screws circularly arranged in threaded engagement with said framework, and a series of lugs respectively freely rotatable about each of said screws, each of said lugs having flanges at the extremities thereof so as to form the boundaries of a groove for engaging a portion of said cam, said flanges extending beyond said cam, whereby rotation of said screws effects smooth, continuous deformation of said cam, a follower travelling on said cam within the grooves of said lugs, and mechanical linkage between said follower and said shafts whereby any deformation of said cam is translated to change the relative angular positions of said shafts.

HORACE E. OVERACKER.

REFERENCES CITED

The following references are of record in the file of this patent:

UNITED STATES PATENTS

| Number | Name | Date |
|---|---|---|
| 1,131,953 | Pilkington | Mar. 16, 1915 |
| 1,525,052 | Spotz | Feb. 3, 1925 |
| 2,336,361 | Lear | Dec. 7, 1943 |
| 2,409,130 | Lear | Oct. 8, 1946 |